United States Patent Office 2,730,941
Patented Jan. 17, 1956

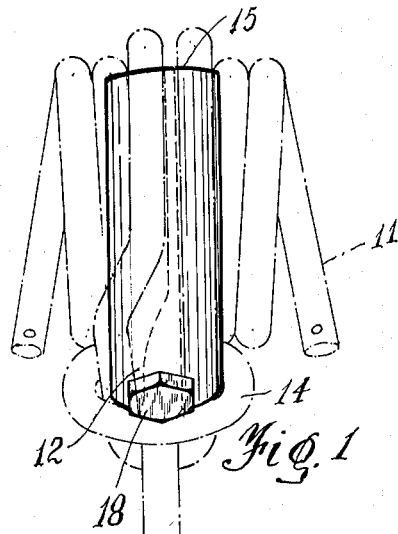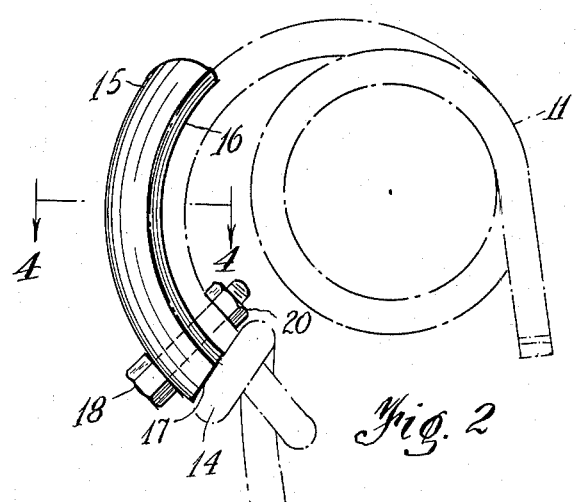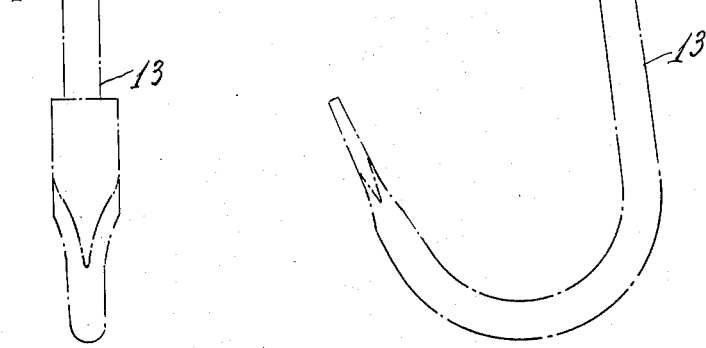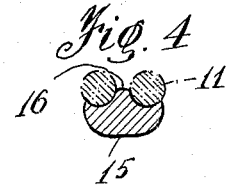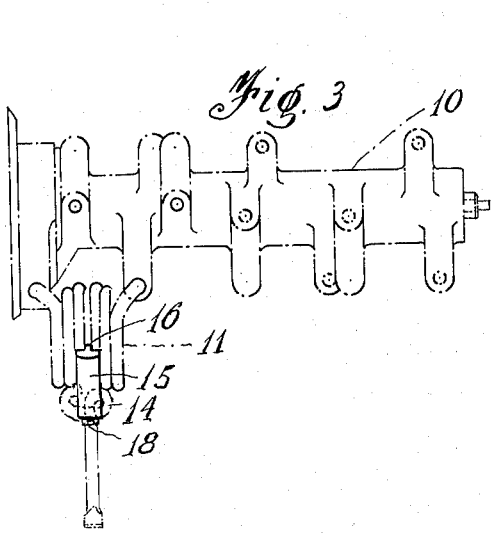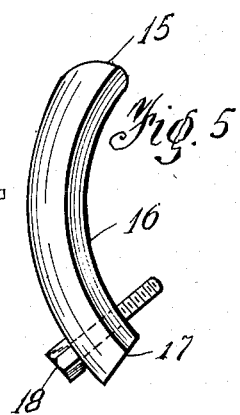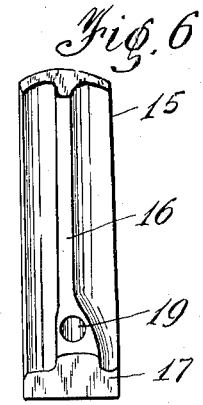

2,730,941

LOCK AND WEAR PLATE ASSEMBLY FOR TILLERS

Alex Glebovich, Indiana, Pa.

Application May 7, 1953, Serial No. 353,489

4 Claims. (Cl. 97—216)

This invention relates to rotary pulverizers for agricultural tilling and particularly to a locking and wearing plate assembly or shoe for tine holders thereof.

Rotary pulverizers having tine holders provided with an elongated loop through which a tine passes have long been known. One particular form is known commercially as the "Rototiller."

In such devices there is a tendency for the tine to shift in the elongated loop, particularly when tilling in rocky soil, and to thereby lose efficiency and tilling depth. There is additionally an excessive amount of wear on the tine holder adjacent the elongated opening.

An object of the present invention is to provide a locking and wear plate assembly for such tine holders.

Another object of this invention is to provide a locking and wear plate assembly which is quickly installed or removed.

Other objects and advantages of this invention will be apparent from the following description and the accompanying drawings in which:

Figure 1 is a bottom plan view of the assembly of this invention installed on a tine holder.

Figure 2 is a side elevation of the assembly of Figure 1.

Figure 3 is a plan view of the shaft of a rotary pulverizer showing the assembly in place thereon.

Figure 4 is a section on the line 4—4 of Figure 2.

Figure 5 is a side elevation of the locking and wear plate assembly of the invention removed from the tine holder.

Figure 6 is a top plan view of the assembly removed from the tine holder.

Referring to the drawings there is illustrated a rotary pulverizer shaft 10 carrying a tine holder 11 thereon. The tine holder 11 is made up of spring steel coiled as illustrated and provided with an elongated opening 12 through which a tine 13 passes. The tine 13 in turn is provided with a loop 14 which surrounds the portion of the tine holder 11 having the elongated opening 12. The tine 13 is inserted through the opening 12 and drawn forward therein until forced against the end of the opening. A curved shoe 15 having an inwardly projecting locking rib 16 is inserted into the elongated opening and into the gap between the members of the tine-holders 11. A biased face 17 presses against the end of the tine loop 14 and is drawn tightly against it by a bolt 18 passing through an opening 19 in the shoe and rib portion which enters the elongated opening. Tightening the nut 20 draws the biased face into engagement with the tine loop and the rib 16 into the opening 12 as shown in Figures 1 through 4. This prevents the tine from shifting or changing position in the tine holder and at the same time absorbs the wear and shock which otherwise is borne by the tine holder 11.

While a preferred embodiment of the invention has been illustrated and described it will be understood that it may be otherwise embodied within the scope of the following claims:

I claim:

1. A lock and wear plate assembly for tine holders of rotary pulverizers having a loop through which a tine passes, comprising a curved member having the contour of the tine holder, an inwardly projecting rib on the inner surface of the curved member adapted to be seated in the loop behind the tine, a shoulder on one end of the curved member adapted to abut the tine for preventing movement of the tine in said loop and means on said curved member for detachably connecting said member to the tine holder.

2. A lock and wear plate assembly for resilient tine holders of rotary pulverizers provided with an elongated opening through which a tine passes and is drawn tightly against one end, comprising a curved member having the general contour of the tine holder, an inwardly projecting rib on the inner surface of the curved member engaging the end of the elongated opening opposite the tine, shoulder means on said curved member abutting the tine and preventing movement thereof in said opening and means on said member passing through the opening for removably engaging the tine holder.

3. A lock and wear plate assembly for tine holders as claimed in claim 2 in which the shoulder means is provided with an angular surface and means are provided for tightening the means for removably engaging the tine holder whereby increased pressure may be brought to bear on the tine.

4. A lock and wear plate assembly for tine holders as claimed in claim 2 in which the shoulder means is provided with an angular surface and the removable engaging means is a bolt passing through an opening in the curved member and the rib thereon and through the opening adjacent the tine and which may be tightened therein to bring increased pressure to bear between the angular shoulder and the tine.

References Cited in the file of this patent

UNITED STATES PATENTS

| 1,944,937 | Kelsey | Jan. 30, 1934 |
| 2,277,424 | White | Mar. 24, 1942 |

FOREIGN PATENTS

| 542,103 | Germany | Jan. 19, 1932 |
| 610,428 | Germany | Mar. 9, 1935 |